(12) United States Patent
Putzolu et al.

(10) Patent No.: US 6,611,864 B2
(45) Date of Patent: *Aug. 26, 2003

(54) EXTENSIBLE POLICY-BASED NETWORK MANAGEMENT ARCHITECTURE

(75) Inventors: David M. Putzolu, Forest Grove, OR (US); Rajendra Yavatkar, Portland, OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/393,138

(22) Filed: Sep. 10, 1999

(65) Prior Publication Data

US 2003/0018760 A1 Jan. 23, 2003

(51) Int. Cl.[7] .............................................. G06F 15/173
(52) U.S. Cl. ....................... 709/223; 709/223; 709/224; 709/243; 710/8; 710/15; 713/100
(58) Field of Search ................................. 709/101, 102, 709/201, 203, 223, 224; 710/5, 8–10, 15–19; 713/100–201

(56) References Cited

U.S. PATENT DOCUMENTS

| | | | |
|---|---|---|---|
| 5,872,966 A | * | 2/1999 | Burg |
| 6,058,482 A | * | 5/2000 | Liu |
| 6,131,112 A | * | 10/2000 | Lewis et al. |
| 6,167,445 A | * | 12/2000 | Gai et al. |
| 6,255,943 B1 | * | 7/2001 | Lewis et al. |
| 6,260,078 B1 | * | 7/2001 | Fowlow |
| 6,301,613 B1 | * | 10/2001 | Ahlstrom et al. |
| 6,308,208 B1 | * | 10/2001 | Jung et al. |
| 6,327,618 B1 | * | 12/2001 | Ahlstrom et al. |
| 6,336,139 B1 | * | 1/2002 | Feridun et al. |

OTHER PUBLICATIONS

Jim Boyle, Ron Cohen, David Durham, Shai Herzog, Raju Rajan, Arun Sastry; "The COPS (Common Open Policy Service) Protocol", IETF Draft Version 0.7, <URL;ftp://ftp.sonycs1.co.jp/mirror/ftp.iij.ad.jp/internet-drafts/draft/-ietf-rap-cops-07.txt>, X9002158234, Aug. 16, 1999, pp. 1–36.

M. Feridun, W. Kasteleijn, J. Krause; "Distributed Management with Mobile Components", IBM Research Report RZ3102, IBM Research Division, Zurich Research Laboratory, Feb. 1999, pp. 857–870, XP002158233.

D. Hyde, "Web Based Management", 3COM Techinical Papers, <URL:http://www.3com.com/nsc/500627.html>, X9002158235, pp. 1–9.

M. Baldi, S. Gai, G. Picco, "Exploiting Code Mobility in Decentralized and Flexible Network Management", PRTOC Mobile Agents '97.

* cited by examiner

Primary Examiner—Ayaz Sheikh
Assistant Examiner—Young N. Won
(74) Attorney, Agent, or Firm—Steven P. Skabrat

(57) ABSTRACT

Extending network capabilities for a network with a policy-based network management (PBNM) architecture. The method includes sending a first message from a policy enforcement point (PEP) to a policy decision point (PDP) in response to an external action, and sending a Java object in a second message from the PDP to the PEP in response to receiving the first message. The Java object may be executed on the PEP to implement a policy.

6 Claims, 4 Drawing Sheets

EXTENSIBLE POLICY-BASED NETWORK MANAGEMENT ARCHITECTURE

BACKGROUND

1. Field

The present invention relates generally to management of networks of computer systems and, more specifically, to policy-based network management (PBNM).

2. Description

Computer network management is growing increasingly more complex and difficult due in part to the unrelenting expansion of today's enterprise networks. New applications such as intranets, priority business applications, multicast-based applications, and multimedia require a network that is capable of supporting traffic level monitoring, self-reconfiguration, multi-point communication, software distribution, security, and of adjusting to changing application requirements through deployment of new services. Policy-based network management (PBNM) is a recent approach to network management that attempts to provide a higher level interface to network management than has been previously available. PBNM hides the low-level mechanisms of network management behind a high level abstraction called policies. Policies are human-readable, simple to express propositions that dictate what actions and behaviors are permitted on a computer network. Using PBNM, a network administrator can express a set of policies governing the network. For example, one policy might be "allow members of the engineering department to reserve 100 Kbits/s of network bandwidth between the hours of 9:00 AM and 5:00 PM." The underlying PBNM architecture handles the resolution of technical issues such as the association of the user's Internet Protocol (IP) addresses to group membership, detection and permission/refusal of bandwidth reservations, time of day that a bandwidth request is to be active, and so on. This abstraction of network management and the associated hiding of the specific mechanisms used to implement policies allow for a richer, more powerful set of services to be managed and deployed on computer networks.

Current PBNM architectures use a static, localized set of mechanisms for controlling the behavior of computer networks. One known PBNM protocol is the Common Open Policy Service (COPS) protocol. The COPS protocol is a "work in progress" or draft protocol of the Internet Engineering Task Force (IETF) dated Aug. 16, 1999, which may be found on the Internet at http://www.ietf.org/internet-drafts/draft-ietf-rap-cops-07.txt. The COPS protocol describes a client/server model for supporting policy control over Quality of Service (QoS) signaling protocols and provisioned QoS resource management. In the COPS protocol, clients, called policy enforcement points (PEPs), relay information about network resource requests to policy decision points (PDPs), which interpret policies so as to determine whether a request for network service should be honored or not. More generally, policies consist of sets of conditions that must be met before certain actions can be taken.

For each new type of managed network resource, an extension must be defined for the COPS protocol (through the IETF procedures). In addition, changes must be made in the PEPs to allow outsourcing of decisions via the newly extended COPS protocol. The conditions and actions taken as a result of an evaluation by a PDP are fairly static as well. Typically, the actions consist of allowing or rejecting access to some resource (e.g., network bandwidth, multicast groups, etc.), along with a small set of predefined conditions such as group membership and time of day. In addition to these requirements, the conditions used in PEPs to trigger requests for policy evaluation, as well as actions taken by PEPs in response to such evaluation, tend to be strictly local in scope (that is, focused on a single network node). Thus, the policy evaluation conditions used in PEPs typically do not take into account the state of other devices in the network.

While PBNM provides a powerful means of managing computer networks, its static definition of the mechanisms that can be managed and the actions that can be decided on makes it slow to respond to the rapid evolution of network services and capabilities that is taking place. Furthermore, the local scope of PBNM conditions and actions tend to limit the network-wide utility of PBNM to solving those problems which do not require access to the global state of the network.

SUMMARY

An embodiment of the present invention is a method of extending the capabilities of a network with a policy-based network management (PBNM) architecture. The method includes sending a first message from a policy enforcement point (PEP) to a policy decision point (PDP) in response to an external action, and sending a Java object in a second message from the PDP to the PEP in response to receiving the first message.

Another embodiment of the present invention includes sending a first message from a policy enforcement point (PEP) to a policy decision point (PDP) requesting configuration of conditions, sending a Java object in a second message from the PDP to the PEP in response to receiving the first message, and executing the Java object on the PEP to configure conditions controlling the sending of messages from the PEP to the PDP.

Other embodiments are described and claimed.

BRIEF DESCRIPTION OF THE DRAWINGS

The features and advantages of the present invention will become apparent from the following detailed description of the present invention in which.

DETAILED DESCRIPTION

As enterprise network and computing devices such as routers and servers have become more computationally powerful, new features have been added to these devices which leverage the available processing power to enable greater extensibility. In particular, the use of Java Virtual Machines (JVMs) has appeared in computer industry applications and academic research as a flexible, secure method of running programs to extend the functionality of devices that previously only supported a fixed set of features.

An embodiment of the present invention extends the current policy-based network management (PBNM) architecture by utilizing the benefits afforded by the Java programming language and JVMs. An embodiment of the present invention allows network administrators and PBNM vendors to programmatically extend the set of conditions and actions that may be incorporated into policies in a PBNM system. In one embodiment, this extension may be accomplished using the Common Open Policy Service (COPS) protocol, although other embodiments may use other protocols. One embodiment of the present invention uses the COPS protocol to carry Java objects (e.g., self-contained programs) between policy decision points (PDPs) and policy enforcement points (PEPs). This usage of the COPS protocol to carry dynamic, executable programs rather than static configuration and decision information is a powerful extension to the concept of PBNM. Since the Java objects communicated by this architecture are fully programmable, network aware applications, the objects have the ability to contact and coordinate with other instances of such applications (executing on other nodes within the network), thereby providing a greater degree of inter-PEP communication than before. In general, by sending Java objects to PEPs, the PEPs may use a richer set of conditions for policy evaluation and implement a more powerful set of actions for manipulating the state of the network.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
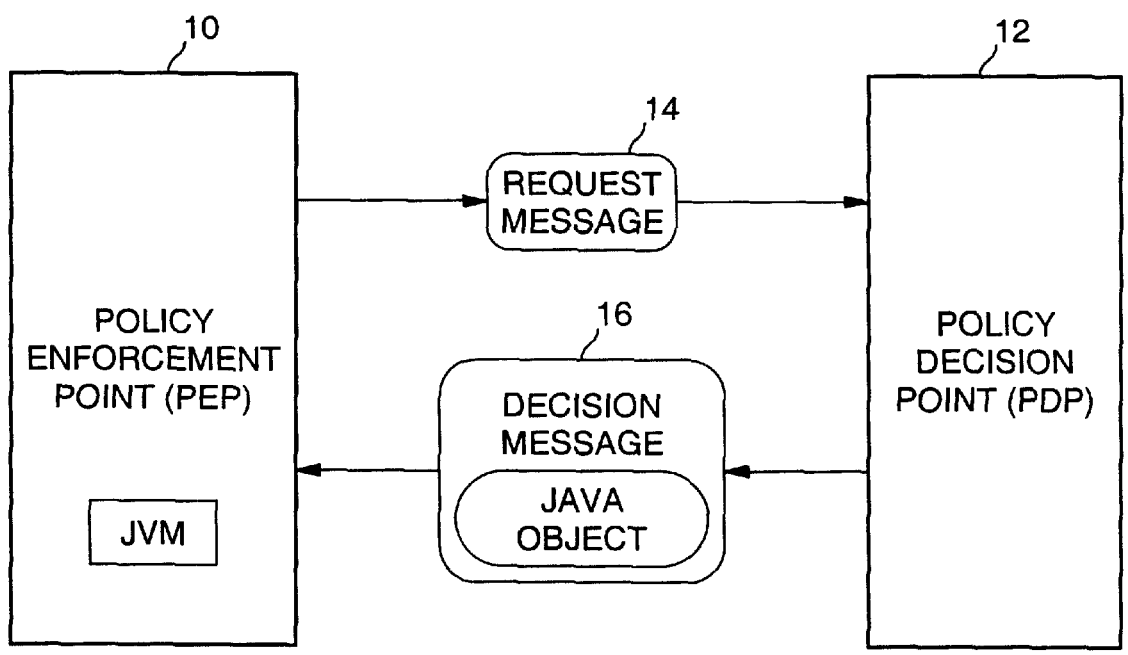
FIG. 1 is a diagram of a policy enforcement point interacting with a policy decision point for dynamic policy actions according to an embodiment of the present invention.

FIG. 1 is a diagram of a policy enforcement point interacting with a policy decision point for dynamic policy actions according to an embodiment of the present invention. A policy enforcement point (PEP) 10 may be a dedicated device for providing network functionality that implements a policy in a PBNM system architecture. For example, the PEP may comprise a network router, a switch, or a firewall. A PEP may be a client in a client/server model, such as is used in the COPS protocol. A policy decision point (PDP) 12 correlates policy information to instruct one or more PEPs in handling network packets or otherwise providing network services. A PDP may be a server in the client/server model. In one embodiment, the PDP may be a general purpose computer system. There may be one or more PDPs and one or more PEPs in this network architecture. Multiple PDPs may be linked in a hierarchical fashion.

In this protocol, a PEP sends request, update, and delete messages to a PDP, and the PDP returns decision messages back to the PEP. Hence, the PEP communicates with the PDP to obtain policy decisions or directives for network management. The protocol uses the well-known transmission control protocol (TCP) as its transport protocol for reliable exchange of messages between the PDP and the PEPs. The protocol relies on the well-known Internet Protocol Security (IPSEC) protocol for authentication and security of the communications path between the PDP and the PEPs. The protocol is stateful in that it allows the PDP to push configuration information to a PEP, and then allows the PDP to remove such state from the PEP when it is no longer applicable. The PEP is responsible for initiating a persistent TCP connection to a PDP. The PEP uses this TCP connection to send requests to and receive decisions from the remote PDP. Communication between the PDP and the PEP is primarily in the form of stateful request/decision message exchanges, although the PDP may occasionally send unsolicited decision messages to the PEP to force changes in previously approved request states.

The policy protocol is designed to communicate self-identifying objects which contain the data necessary for identifying request states, establishing the context for a request, identifying the type of request, referencing previously installed requests, relaying policy decisions, reporting errors, and transferring client specific/name space information.

In FIG. 1, PEP 10 sends a COPS request message 14 at run-time to PDP 12 in response to some external action within the network, such as a set of conditions requiring evaluation by the PDP. The request message may include such items as common header information, a client handle, a context object containing data, and other parameters. The context object may be used to determine the context within which all other message objects are to be interpreted. It also may be used to determine the kind of decision to be returned from the PDP. The context object specifies the type of event(s) that triggered a query. The decision may be a directive or instruction to the PEP related to admission control, resource allocation, object forwarding and substitution, or configuration. In response to the request message, PDP 12 returns a decision message 16 to the PEP. Rather than delivering a static decision, in one embodiment of the present invention the PDP downloads a Java object to the PEP to be executed on the PEP for implementation of the desired policy. The Java object may contain any program written in the Java programming language to effect the desired result at the PEP. Of course, the PEP must include a Java Virtual Machine (JVM) for supporting execution of the Java object received from the PDP. Thus, this mechanism is dynamic and easily extensible.

Figure 2:
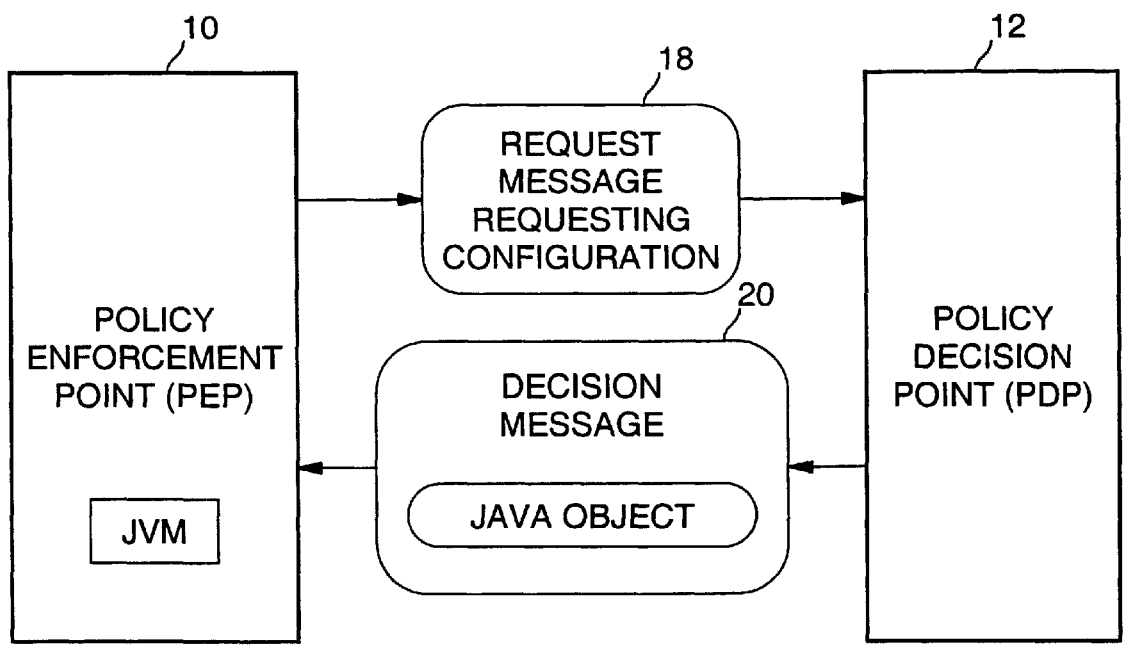
FIG. 2 is a diagram illustrating dynamic policy conditions according to an embodiment of the present invention.
Figure 3:
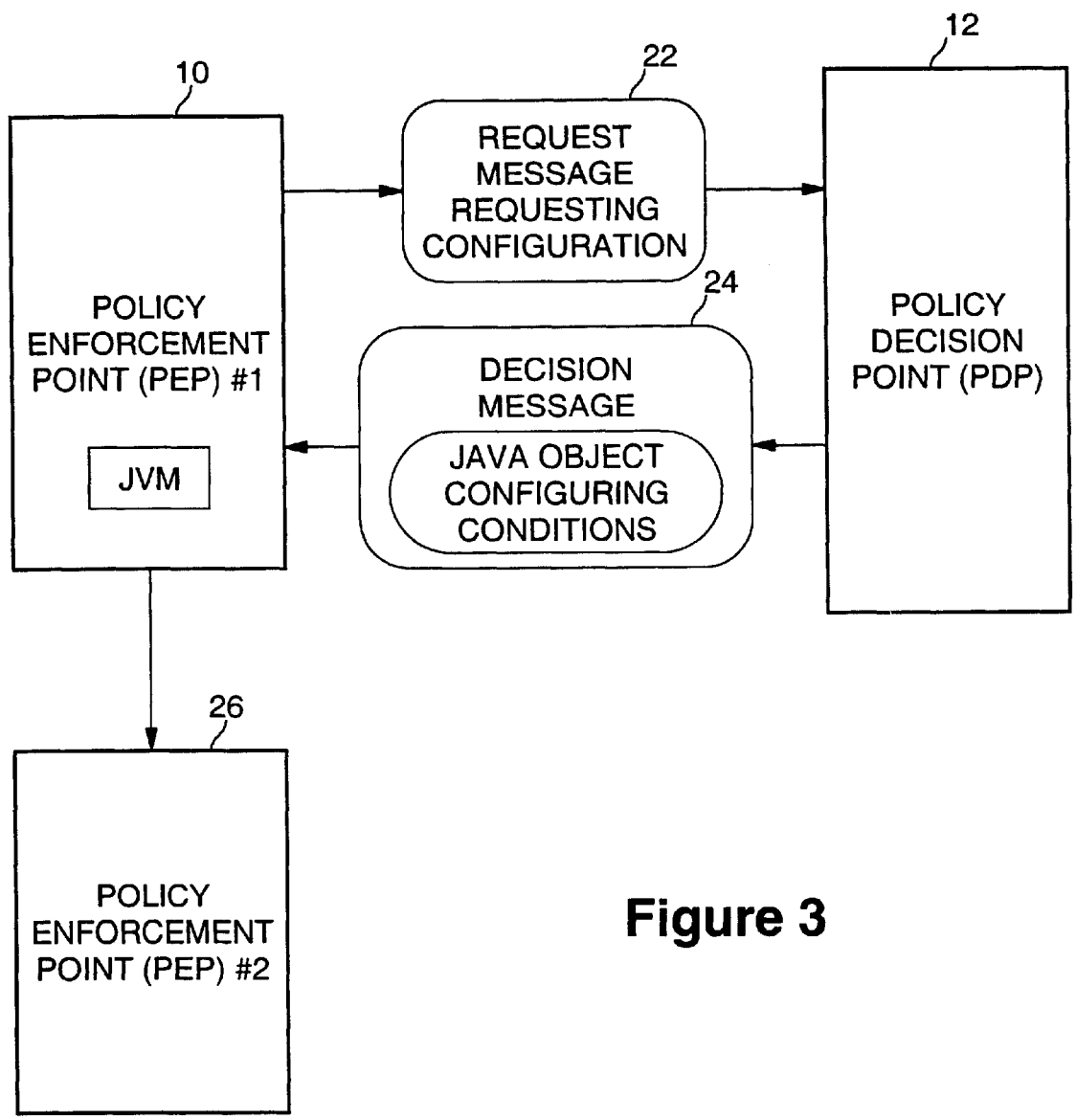
FIG. 3 is a diagram illustrating dynamic policy conditions taking into account network-wide state information according to an embodiment of the present invention.

In another embodiment, a COPS configuration request object (carried in a context object within a request message sent by the PDP to a PEP at initialization time) may be used to download a set of Java programs from a PDP to a PEP such that the conditions used to trigger issuance of request messages by the PEP are programmable as well. In both cases, the Java application programs installed at the PEPs are able to interact both with each other and with other devices (PEPs or other devices) in the network to evaluate conditions and implement actions. FIG. 2 is a diagram illustrating dynamic policy conditions according to an embodiment of the present invention. In this embodiment, a PEP 10 sends a COPS request message 18 to a PDP 12 requesting configuration within a context object. A PEP may request to receive named configuration information from the PDP in this way. This named configuration data may be in a form useful for setting system attributes on a PEP, or it may be in the form of policy rules that are to be directly verified by the PEP. In response, the PDP sends a Java object to the PEP in a decision message 20. The Java object, when executed at the PEP, configures the conditions for subsequent policy evaluation. In one embodiment, these actions may be performed at network initialization time. In alternate embodiments, the Java object sent to the PEP may perform any desired processing and not be limited to configuration functions.

In another embodiment, the Java applications installed and executed in the PEPs as part of actions taken in response to fulfillment of policy conditions may be used to affect or update the state at other network nodes (e.g., other PEPs). This feature allows for policies that both detect and manipulate distributed network (e.g., global) state information. FIG.

3 is a diagram illustrating dynamic policy conditions taking into account network-wide state information according to an embodiment of the present invention. A PEP 10 sends a COPS request message 22 at initialization time to PDP 12 requesting configuration within a context object. In response, the PDP sends a Java object to the PEP in a decision message 24. This first Java object configures conditions for policy evaluation by the PEP. At some later point in time, an event occurs at PEP 10 triggering run-time evaluation of policy conditions. The PEP then sends another request message to the PDP. In response, the PDP sends another Java object to the PEP. This second Java object then executes on this PEP. The second Java object is able to examine and manipulate network state information at another PEP 26 or other node in the network as part of evaluating policy conditions. In alternate embodiments, the first and second Java objects may be sent to the PEP together at initialization time, or may be the same object.

In order to allow PBNM functionality to better support rapidly changing network capabilities, embodiments of the present invention use delivery of Java programs from a PDP to a PEP to allow dynamic extension of both the actions taken in execution of policies, as well as the conditions used to evaluate whether an action should be taken or not. This allows PEPs to be more flexible both in actions and conditions they support and the classes of problems that can be addressed.

In one example of using embodiments of the present invention, a monitoring system may be designed which employs a PBNM system along with the extensions defined in the present invention. The monitoring system may allow policies to be created which specify the maximum latency that a particular data flow will experience between two endpoints in a network. An example of the use of such a configuration may be a person who accepts telephone orders and enters the orders into an order entry system, where the network latency between the person's personal computer (PC) system or order entry terminal and the server system that executes the order entry system should be kept low in order to ensure prompt customer order entry. In this case, a Java object may be installed on each PEP to monitor the latency of packets from the indicated flow experience as the packets traverse the PEP. The Java object may also communicate with the objects of other PEPs in a transmission path (e.g., its neighbor objects) in order to determine total end-to-end latency. When the end-to-end latency reaches a predetermined amount, the objects at the PEPs with the higher latency may communicate with their neighbor objects, asking the neighbors to divert non-critical traffic to other routes to reduce latency. In the preceding description, various aspects of the present invention have been described. For purposes of explanation, specific numbers, systems and configurations were set forth in order to provide a thorough understanding of the present invention. However, it is apparent to one skilled in the art having the benefit of this disclosure that the present invention may be practiced without the specific details. In other instances, well-known features were omitted or simplified in order not to obscure the present invention.

Embodiments of the present invention may be implemented in hardware or software, or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system embodying the PDP or PEP includes any system that has a processor, such as, for example, a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

Figure 4:
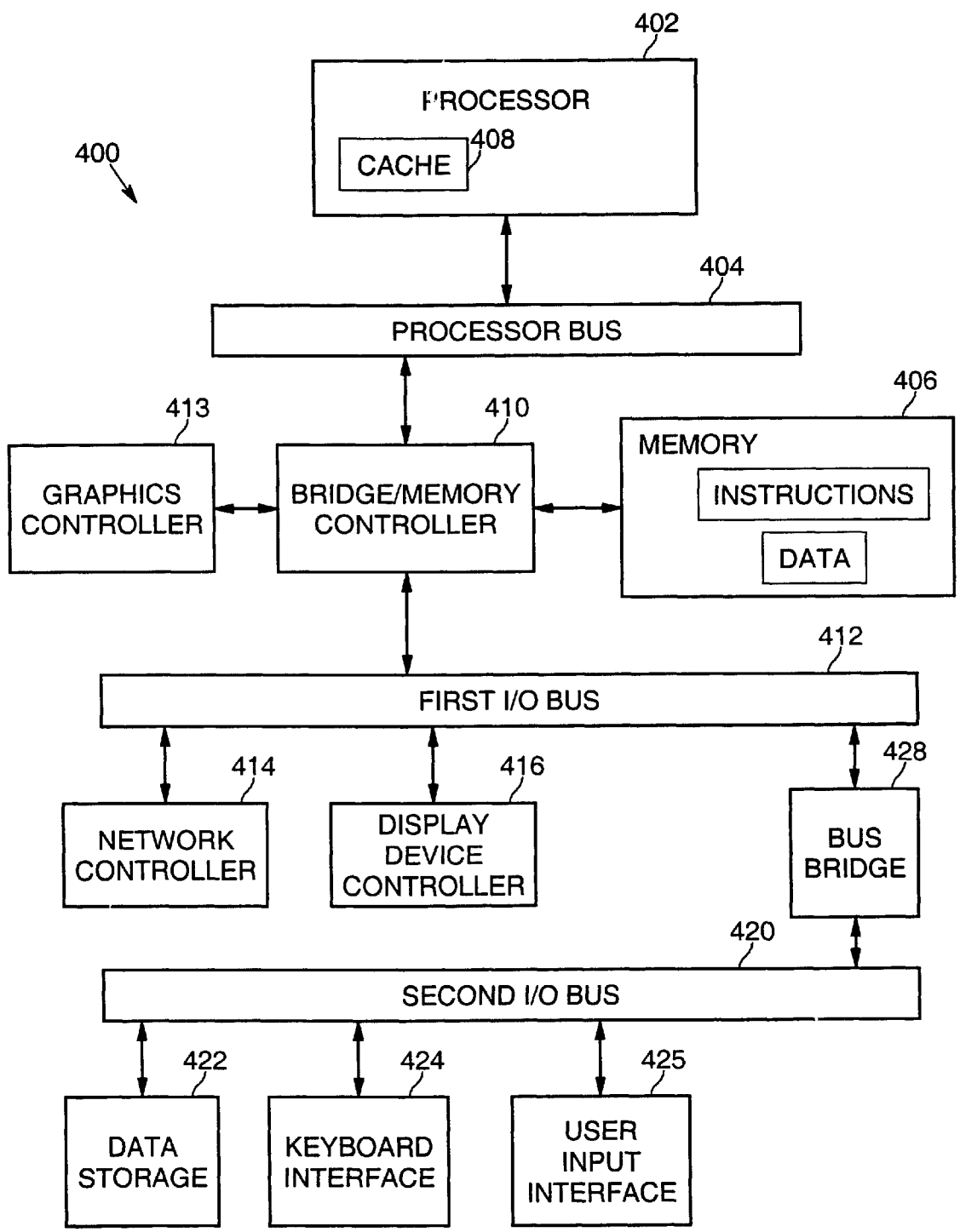
FIG. 4 is a diagram illustrating a sample processing system capable of being operated as a policy decision point according to an embodiment of the present invention.

An example of one such type of processing system is shown in FIG. 4, however, other systems may also be used and not all components of the system shown are required for the present invention. Sample system 400 may be used, for example, to execute the processing for embodiments of the extensible policy-based network management system, in accordance with the present invention, such as the embodiment described herein. One or more of the PDP and PEP may be implemented on a sample system. Sample system 400 is representative of processing systems based on the PENTIUM®II, PENTIUM® III, and CELERON™ microprocessors available from Intel Corporation, although other systems (including personal computers (PCs) having other microprocessors, engineering workstations, other set-top boxes, switches, routers, and the like) and architectures may also be used. In one embodiment, sample system 400 may be executing a version of the WINDOWS® operating system available from Microsoft Corporation, although other operating systems and graphical user interfaces, for example, may also be used.

FIG. 4 is a block diagram of a system 400 of one embodiment of the present invention. The system 400 includes a processor 402 that processes data signals. The processor 402 may be a complex instruction set computer (CISC) microprocessor, a reduced instruction set computing (RISC) microprocessor, a very long instruction word (VLIW) microprocessor, a processor implementing a combination of instruction sets, or other processor device, such as a digital signal processor, for example. Processor 402 may be coupled to a processor bus 404 that transmits data signals between processor 402 and other components in the system 400.

System 400 includes a memory 406. Memory 406 may be a dynamic random access memory (DRAM) device, a static random access memory (SRAM) device, or other memory device. Memory 406 may store instructions and/or data represented by data signals that may be executed by processor 402. The instructions and/or data may comprise code for performing any and/or all of the techniques of the present invention. Memory 406 may also contain additional software and/or data (not shown). A cache memory 408 may reside inside processor 402 that stores data signals stored in memory 406. Cache memory 408 in this embodiment speeds up memory accesses by the processor by taking advantage of its locality of access. Alternatively, in another embodiment, the cache memory may reside external to the processor.

A bridge/memory controller 410 may be coupled to the processor bus 404 and memory 406. The bridge/memory controller 410 directs data signals between processor 402, memory 406, and other components in the system 400 and bridges the data signals between processor bus 404, memory 406, and a first input/output (I/O) bus 412. In some embodiments, the bridge/memory controller provides a graphics port for coupling to a graphics controller 413. In this embodiment, graphics controller 413 interfaces to a display device (not shown) for displaying images rendered or otherwise processed by the graphics controller 413 to a user.

First I/O bus 412 may comprise a single bus or a combination of multiple buses. First I/O bus 412 provides communication links between components in system 400. A network controller 414 may be coupled to the first I/O bus 412. The network controller links system 400 to a network that may include a plurality of processing systems (not shown in FIG. 4) and supports communication among various systems. The network of processing systems may comprise a local area network (LAN), a wide area network (WAN), the Internet, or other network. In some embodiments, a display device controller 416 may be coupled to the first I/O bus 412. The display device controller 416 allows coupling of a display device to system 400 and acts as an interface between a display device (not shown) and the system. The display device receives data signals from processor 402 through display device controller 416 and displays information contained in the data signals to a user of system 400.

A second I/O bus 420 may comprise a single bus or a combination of multiple buses. The second I/O bus 420 provides communication links between components in system 400. A data storage device 422 may be coupled to the second I/O bus 420. The data storage device 422 may comprise a hard disk drive, a floppy disk drive, a CD-ROM device, a flash memory device, or other mass storage device. Data storage device 422 may comprise one or a plurality of the described data storage devices.

A keyboard interface 424 may be coupled to the second I/O bus 420. Keyboard interface 424 may comprise a keyboard controller or other keyboard interface device. Keyboard interface 424 may comprise a dedicated device or may reside in another device such as a bus controller or other controller device. Keyboard interface 424 allows coupling of a keyboard to system 400 and transmits data signals from a keyboard to system 400. A user input interface 425 may be coupled to the second I/O bus 420. The user input interface may be coupled to a user input device, such as a remote control, mouse, joystick, or trackball, for example, to provide input data to the computer system. A bus bridge 428 couples first I/O bridge 412 to second I/O bridge 420. The bus bridge operates to buffer and bridge data signals between the first I/O bus 412 and the second I/O bus 420.

Embodiments of the present invention are related to the use of the system 400 as a PDP or PEP. According to one embodiment, such processing may be performed by the system 400 in response to processor 402 executing sequences of instructions in memory 404. Such instructions may be read into memory 404 from another computer-readable medium, such as data storage device 422, or from another source via the network controller 414, for example. Execution of the sequences of instructions causes processor 402 to execute PDP or PEP processing according to embodiments of the present invention. In an alternative embodiment, hardware circuitry may be used in place of or in combination with software instructions to implement embodiments of the present invention. Thus, the present invention is not limited to any specific combination of hardware circuitry and software.

The manner in which elements of system 400 perform their conventional functions is well-known in the art. In particular, data storage device 422 may be used to provide long-term storage for the executable instructions and data structures for embodiments of PDPs and PEPs in accordance with the present invention, whereas memory 406 is used to store on a shorter term basis the executable instructions of embodiments of PDPs and PEPs in accordance with the present invention during execution by processor 402.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method of extending network capabilities for a network with a policy-based network management (PBNM) architecture comprising:
    sending a first message from a policy enforcement point (PEP) to a policy decision point (PDP) requesting configuration of conditions for a policy used to detect and manipulate distributed network state information;
    sending a first Java object in a second message from the PDP to the PEP in response to receiving the first message;
    executing the first Java object on the PEP to configure conditions for policy evaluation;
    sending a third message from the PEP to the PDP in response to an external event triggering run-time evaluation of policy conditions by the PEP;
    sending a second Java object in a fourth message from the PDP to the PEP in response to receiving the third message; and
    executing the second Java object on the PEP, wherein the second Java object, when executing, at least one of examines a state of another device in the network as part of evaluating a policy condition and changes the state of another device in the network.

2. The method of claim 1, wherein the PBNM architecture operates according to a Common Open Policy Service (COPS) protocol, the first and third messages comprise request messages, and the second and fourth messages comprise decision messages.

3. The method of claim 1, wherein sending the first message, sending the second message, and executing the first Java object are performed at network initialization time.

4. A policy-based network management (PBNM) system for a network comprising:
    at least one policy enforcement point (PEP) to send a first message requesting configuration of conditions for a policy used to detect and manipulate distributed network state information; and at least one policy decision point (PDP) to send at least first and second Java objects to the at least one PEP in response to receiving the first message, wherein the at least one PEP executes the first Java object to configure conditions for policy evaluation, and executes the second Java object in response to an event triggering run-time evaluation of policy conditions by the PEP, the second Java object at least one of examining a state of another device in the network as part of evaluating a policy condition and changing the state of another device in the network.

5. The system of claim 4, wherein sending the first message, sending the second message, and executing the first Java object are performed at network initialization time.

6. An article comprising: a machine readable medium having a plurality of machine readable instructions, wherein when the instructions are executed by at least one processor, the instructions implement a policy-based network management (PBNM) system for a network by sending a first message from a policy enforcement point (PEP) to a policy decision point (PDP) requesting configuration of conditions for a policy used to detect and manipulate distributed network state information;

sending at least first and second Java objects from the PDP to the PEP in response to receiving the first message;

configuring conditions for policy evaluation; and in response to an event triggering run-time evaluation of policy conditions by the PEP, at least one of examining a state of another device in the network as part of evaluating a policy condition and changing the state of another PEP in the network.

* * * * *